Oct. 2, 1934.  F. D. CHAPMAN  1,975,073
AGITATING APPARATUS
Filed May 15, 1933  2 Sheets-Sheet 1
Fig. 1.
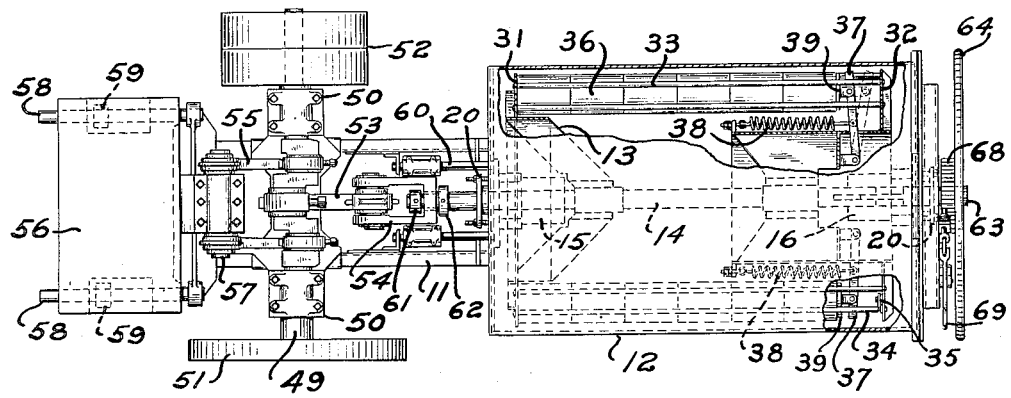
Fig. 2.
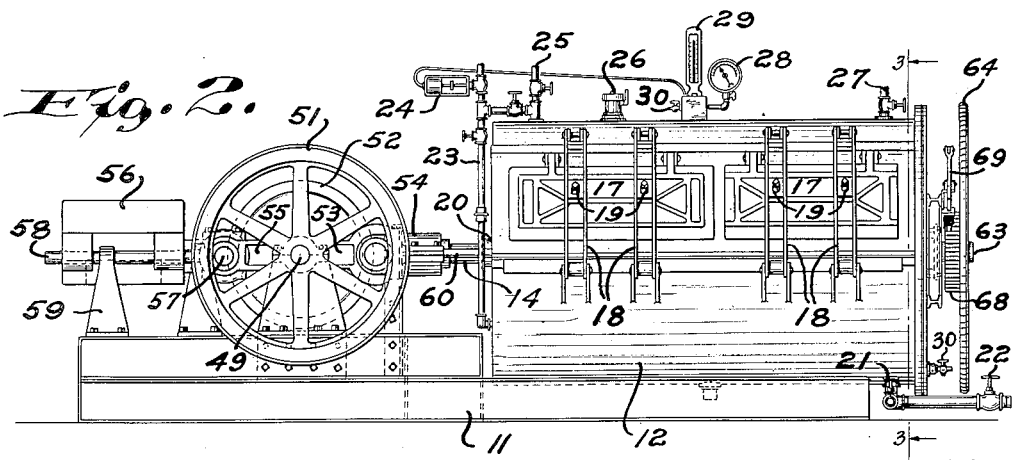
Fig. 3.
Fig. 5.
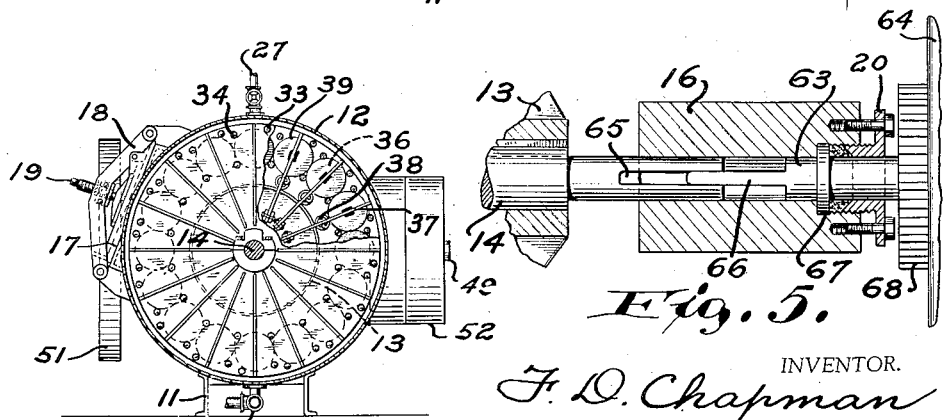
INVENTOR.
F. D. Chapman
BY
Morsell, Lieber & Morsell
ATTORNEYS.

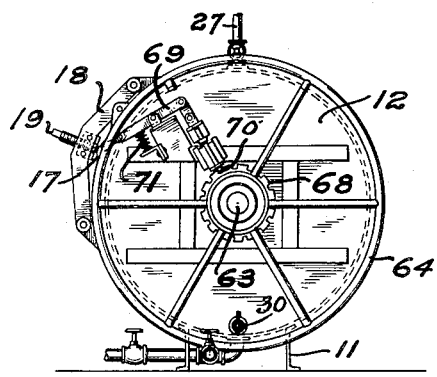
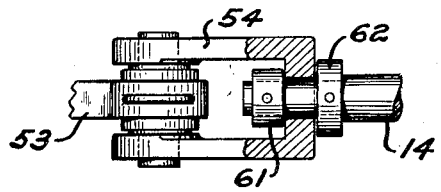
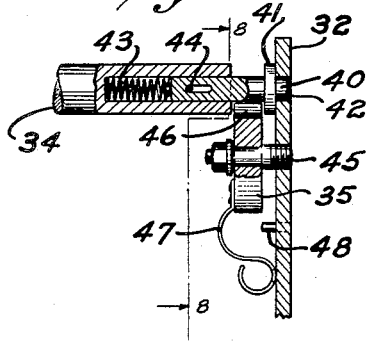
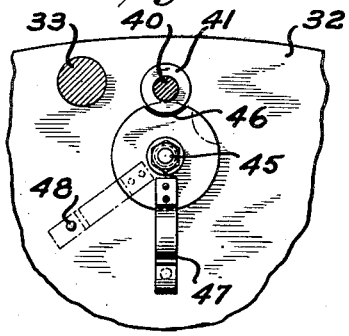
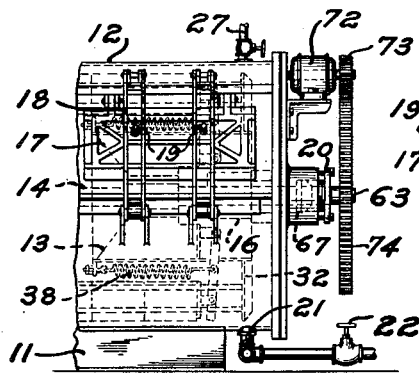
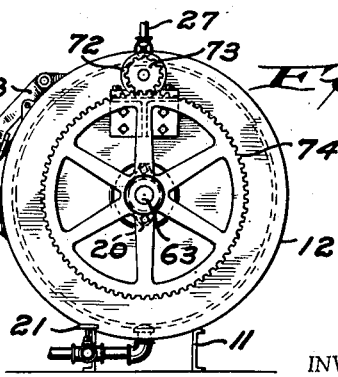

Patented Oct. 2, 1934

1,975,073

UNITED STATES PATENT OFFICE 1,975,073

AGITATING APPARATUS

Frank D. Chapman, Berlin, Wis.

Application May 15, 1933, Serial No. 671,140

20 Claims. (Cl. 126—272)

The present invention relates in general to improvements in the art of treating liquids confined in receptacles, and relates more specifically to improvements in the construction and operation of agitating sterilizers or similar apparatus for heat treating fluent commodities packed in sealed containers such as cylindrical tin cans.

It has been found desirable in order to effectively heat treat or sterilize certain commodities such as a mixture of liquid and granular material, after batches of the commodity have been packed in individual sealed containers such as cans, to maintain the confined batches of mixture in a state of relatively violent agitation during at least a portion of the treating period. Unless this is is done, the product may not be uniformly and effectively sterilized in the shortest period of time and without danger of deterioration, and the ingredients of the final product may not be thoroughly mixed and the soluble solids thereof dissolved. While this agitation can be effected by shaking the loaded and sealed containers, such shaking alone is not sufficient to insure the best results if elongated receptacles such as tin cans are utilized for packing and these containers are merely reciprocated parallel to their longitudinal axes and without being displaced angularly about these axes. On the other hand, mere angular displacement of the containers about their longitudinal axes, is also insufficient to insure most effective agitation, in the absence of longitudinal shaking or reciprocation.

It is therefore an object of the present invention to provide improved apparatus for insuring rapid and most effective agitation of food laden containers or the like, especially during heat treatment of the confined product.

Another more specific object of the invention is to provide a sterilizer wherein a mixture of liquid and other ingredients confined within receptacles, may be thoroughly shaken while the receptacles are disposed in various positions.

A further object of the invention is to provide an improved machine for simultaneously reciprocating a plurality of cylindrical food laden cans along their longitudinal axes, while also permitting angular displacement of the can contents with respect to these axes.

Still another object of the invention is to provide improved mechanism for confining one or more containers within a support during heating and agitation thereof.

Another object of the invention is to provide improved means for supporting a plurality of receptacles such as tin cans, and for effecting convenient loading and unloading of the supporting means.

A further object of the invention is to provide a conveniently manipulable batch sterilizer, and means for compensating for variations in sizes of the food laden cans confined within the sterilizer due to heating and cooling of the commodity.

Still another object of the invention is to provide improved counter-balanced mechanism for shaking a plurality of bodies such as food laden cans.

Another specific object of the invention is to provide various improvements in the details of construction of agitating pressure cookers or sterilizers, whereby the utility and effectiveness of such apparatus is enhanced to a maximum.

These and other objects and advantages of the invention will be apparent from the following detailed description.

A clear conception of the various features of the invention, and of the mode of constructing and of operating several types of sterilizers built in accordance with the improvement, may be had by referring to the drawings accompanying and forming a part of this specification in which like reference characters designate the same or similar parts in the various views:

Fig. 1 is a top view of one type of improved sterilizer, the gages and pipe connections at the top having been omitted, and portions of the retort and the closure plates thereof having been broken away, for the sake of clearness;

Fig. 2 is a side elevation of the improved sterilizer of Fig. 1;

Fig. 3 is a transverse section through the sterilizer taken along the line 3—3 of Fig. 2;

Fig. 4 is an end view of the retort of the sterilizer of Figs. 1, 2 and 3, looking toward the mechanism for manually revolving the cans within the retort;

Fig. 5 is an enlarged fragmentary section through the can cage supporting bearing and splined connection between the rotor and mechanism for manually revolving the same while permitting reciprocation thereof;

Fig. 6 is an enlarged fragmentary section through the connection between the cage reciprocating mechanism and the cage supporting shaft;

Fig. 7 is an enlarged part sectional fragment of the releasable lock for permitting removal of one of the bars of each can confining cage in order to effect insertion or removal of the cans;

Fig. 8 is a transverse section through one of the releasable cage bars, showing the lock in released position in full-lines and in locking position in dot-and-dash lines, the section being taken along the line 8—8 of Fig. 7;

Fig. 9 is a fragmentary side elevation of a modified sterilizer wherein the can supporting rotor is adapted to be rotated mechanically during reciprocation thereof; and Fig. 10 is an end view of the retort of the modified sterilizer of Fig. 9, looking toward the rotor revolving mechanism.

While the invention has been shown and described herein as being specifically applied to a sterilizer for longitudinally shaking a plurality of cylindrical food laden cans during heat treatment thereof, it is not intended to limit the scope by such specific embodiment and some of the novel features are obviously more generally applicable to other types of canning machinery.

Referring to the embodiment of the invention illustrated in Figs. 1 to 8 inclusive, the improved sterilizer comprises in general a base 11 having a stationary cylindrical retort 12 mounted thereon; a can supporting rotor 13 both slidably and rotatably supported within the retort 12 by means of a main shaft 14 mounted in front and rear bearings 15, 16 respectively; mechanism associated with the portion of the shaft 14 adjacent the front bearing 15 for reciprocating the rotor 13 longitudinally of its central axis; and other mechanism associated with the end of the shaft 14 adjacent the rear bearing 16 for effecting rotation of the rotor 13 about its longitudinal central axis, either while the rotor is at rest or during reciprocation thereof.

The retort 12 is provided with a pair of upwardly swingable closure plates 17 pivotally supported upon strong-back levers 18 and adapted to be forced into sealed position by means of clamping screws 19. These strong-back levers 18 are pivoted at the top and have removable retaining pins at the bottom, and stuffing boxes 20 are provided near the bearings 15, 16 for the purpose of hermetically sealing the retort. The retort may also be provided with a water inlet valve 21 and with a drain valve 22 for controlling the supply and discharge of liquid to and from the processing chamber, and has steam piping 23 provided with pressure control mechanism 24 associated with the end thereof remote from the valves 21, 22. The uppermost portion of the retort 12 may be provided with an overflow 25, a safety valve 26, and with an air vent 27, as shown in Fig. 2, and suitable pressure indicating instruments such as a gage 28 and thermometer 29 may also be provided in addition to several bleeder cocks 30, in order to complete the heating and pressure control system.

The improved can supporting and shaking rotor 13 comprises two parallel end disks 31, 32 fixedly attached to the horizontal main shaft 14 so as to permit free reciprocation of the shaft and rotor between the adjacent ends of the bearings 15, 16 and within the retort 12. The peripheral portions of these disks 31, 32 are rigidly interconnected by bars 33 which form an annular series of can confining cages, and each of these cages is provided with a removable bar 34 having a locking disk 35 associated with one end thereof near the disk 32. The hermetically sealed cans 36 are adapted to be positioned end to end within the cages formed by the bars 33, 34, in groups of five or more as indicated in Fig. 1, with their axes parallel to the axis of the shaft 14, and the loading and unloading of the cages may obviously be effected upon drainage of the liquid from the retort 12 and removal of the closure plates 17.

Each of the can confining cages is also provided with means for preventing longitudinal displacement of the cans 36 relative to the disks 31, 32 during reciprocation of the rotor 13, these means consisting of levers 37 pivotally mounted upon the rotor near the shaft 14 and extending radially into the cages, and tension springs 38 attached to the rotor 13 and to the medial portions of the levers 37. The outer ends of the levers 37 carry pivoted plates 39 which are slidable within the corresponding can confining cages and which coact with the end cans 36, thus causing the springs 38 to maintain the successive cans of each group in engagement with each other during shaking thereof. The tension of the springs 38 may be adjusted, and the levers 37 may be swung toward the disk 32 to stretch the springs 38 and thus release the cans 36 during removal thereof.

The releasable cage rods or bars 34 are constructed as shown in detail in Figs. 7 and 8. The ends of the bars 34 which coact with the front disk 31, are merely provided with projections fitting in holes in this disk, and the opposite ends of the bars 34 are bored as illustrated in Fig. 7. Within each of these end bores is confined a plunger 40 having a collar 41 and a reduced outer extremity insertible within a hole 42 in the disk 32. The plunger 40 is urged outwardly along the bore by a relatively strong spring 43 confined within the bore of the bar 34, and the plunger is prevented from leaving the bore of the bar when removed, by a pin 44 coacting with a slot in the plunger. The locking disk 35 of each bar 34 is rotatably supported upon a pivot pin 45 secured to the disk 32, and the disk 35 is provided with a peripheral notch 46 and with a resilient manipulating handle 47 the free end of which is engageable with the inner face of the disk 32 to maintain the locking disk 35 within the annular groove formed by the collar 41 and the adjacent end of the bar 34. With the aid of this handle 47, the disk 35 may be rotated about its pivot pin 45 to either bring the notch 46 in the position shown in full line in Figs. 7 and 8, or to position the periphery of the locking disk 35 between the collar 41 and bar end as shown in dot-and-dash lines. When the disk 35 is in locking position, the handle 47 which has a hole therein, may be applied to an adjacent pin 48 in order to lock the plunger 40, against displacement along the axis of the bar 34, but when the locking disk 35 is swung into released position, the plunger 40 may be pushed back against the spring 43 to remove the end projection thereof from the hole 42 whereupon the opposite end of the bar 34 may be withdrawn from the end disk 31 to permit free insertion or removal of the cans 36 in an obvious manner.

The mechanism for effecting vibration or reciprocation of the rotor 13 within the retort 12, is shown in detail in Figs. 1 and 2, and comprises a shaft 49 mounted in bearings 50 supported upon the base 11 and having a fly-wheel 51 at one end, and driving and idler pulleys 52 at its opposite end. The central portion of the shaft 49 has a crank coacting with one end of a connecting rod 53 the opposite end of which is pivotally attached to a cross-head 54 secured to the adjacent end of the rotor shaft 14. The shaft 49 is also provided with cranks on opposite sides of the central crank, which coact with corresponding ends of connecting rods 55 the opposite ends of which coact with a horizontally slidable counter-balancing weight 56 through a transverse pivot shaft 57. The weight 56 which may be adjustable, is slidably supported upon guide rods 58 carried by brackets 59 secured to the base 11. The cross-head 54 is likewise slidably supported upon parallel guide rods 60 supported upon the base 11, and this cross-head may be attached to the shaft 14 by collars 61, 62 as shown in Fig. 6, in order to permit rotation of the shaft 14 and rotor 13 relative to the cross-head 54 without interfering with transmission of the reciprocation of the cross-head to the shaft.

The mechanism specifically illustrated in Figs. 1, 2, 4 and 5 for manually revolving the rotor 13, consists of an auxiliary shaft 63 rotatably mounted in the bearing 16 in line with the main shaft 14, and a hand wheel 64 secured to the outer end of the shaft 63. The end of the main shaft 14 which is slidable in the bearing 16 is provided with a slot or key-way 65, and the adjacent end of the auxiliary shaft 63 has a key or spline 66 engageable with this key-way 65 to permit free reciprocation of the shaft 14, while permitting simultaneous rotation thereof by the hand wheel 64 through the shaft 63, without interference. The shaft 63 is fixed against reciprocation by a collar 67 secured thereto and coacting with the end of the bearing 16, and a locking wheel 68 is secured to the shaft 63 adjacent to the hand wheel 64. Pivotally mounted upon the retort 12 and movable in the plane of the wheel 68, is a hand lever 69 which carries a latch 70 adapted to engage the successive peripheral notches of the wheel 68, the lever 69 being normally urged into latching position by a spring 71 as shown in Fig. 4. When the latch 70 is in engagement with the wheel 68, the hand wheel 64 and shaft 63 are locked against rotation, but these elements may be conveniently released to permit rotation of the rotor 13 so as to angularly displace the cans 36 about the rotor axis.

As specifically shown in Figs. 9 and 10, the rotor 13 and shaft 14 may be rotated mechanically, either continuously or intermittently, and during shaking thereof or while idle, by means of a motor 72 which rotates the auxiliary shaft 63 through gearing consisting of a pinion 73 and a gear 74. The motor 72 may be supported from the retort 12, and the pinion 73 is driven directly by the motor and drives the gear 74 which is keyed or otherwise attached to the end of the shaft 63. This mechanism should be so constructed that the motor 72 may be stopped at any time in order to permit convenient loading and unloading of the rotor 13.

During normal use of the improved sterilizing apparatus, the rotor 13 must first be loaded with cans 36, and the retort 12 should be sealed and supplied with heating medium at the desired temperature and pressure. The shaft 49 may then be rotated to cause relatively rapid reciprocation of the shaft 14 and of the can laden rotor 13 carried thereby, thus shaking the cans 36 endwise or longitudinally of the shaft 14. If the manually operable mechanism for revolving the rotor 13 is utilized, the latch 70 should be periodically released by manipulation of the lever 69 and the hand wheel 64 rotated to any desired position, in order to change the positions of the cans 36 during shaking thereof. When the mechanical gearing is utilized, the motor 72 may be operated automatically to cause continuous changing of the can positions, and the effectiveness of the agitation may be enhanced by mounting the base 11 so as to slightly incline the central axis of the machine. It will thus be noted that the cans 36 are effectively shaken and the contents thereof thoroughly agitated without permitting accumulation of solids in the lower portion thereof. The shaking and heat treatment may be continued as long as desired, and may be followed by cooling or other treatment.

The connections between the forward end of the shaft 14 and the cross-head 54, and between the rear end of the shaft 14 and the auxiliary shaft 63, will permit uninterrupted shaking of the rotor 13 while also permitting rotation thereof. The sliding connection between the shaft 14 and the auxiliary shaft 63, may however be omitted to cause the hand wheel 64 or the gear 74, whichever is utilized, to reciprocate with the rotor 13, but in that event, the wheel 68 or the gear 74 will necessarily slide relative to the latch 70 or pinion 73 respectively, and the coacting elements must be made wide enough to accommodate this sliding. The levers 37 and springs 38 confine the cans 36 against end displacement, while permitting free expansion and contraction of the cans 36 and the removable bars 34 and disks 35 provide simple and effective means for permitting loading and unloading of the can confining cages. It is to be noted, that the springs 43 should be of sufficient strength to resist the inertia of the bars 34 due to reciprocation thereof, so that even if the locking disks 35 should accidentally be displaced so as to release the lock, the bars 34 will still remain in position. The locking disks 35, on the other hand, will prevent the bars 34 from falling out of place, in case the springs 43 break or become ineffective, and the use of these disks 35 with local notches 46 will assure locking, even in case both the springs 43 and the resilient handles 47 should break, or the latter should become disengaged from the pins 48. The balancing weight 56 moreover provides simple and effective means for preventing excessive vibration of the machine, which would tend to eventually loosen the parts, and the counter-balancing effect may be varied to accommodate varied loading of the rotor 13.

From the foregoing description it will be apparent that the invention provides simple, compact and extremely effective means for agitating the contents of food laden cans 36 or the like, especially during heat treatment thereof under pressure. The machine is conveniently accessible for loading, unloading, and manipulation, and may be operated with minimum power and without undesirable vibration.

It should be understood that it is not desired to limit the invention to the exact details of construction and to the precise mode of operation herein shown and described, for various modifications within the scope of the claims may occur to persons skilled in the art.

What I claim is:

1. In combination, a rotor revolvable about a horizontal axis and formed to support an annular series of endwise contacting rows of cylindrical liquid laden sealed cans, means for reciprocating said rotor along its axis, and means for effecting angular displacement of said rotor about said axis.

2. In combination, a rotor mounted upon a central shaft, means for supporting liquid laden containers near the periphery of said rotor, means associated with one end of said shaft for reciprocating said rotor along the axis of said shaft, and means associated with the opposite end of said shaft for revolving said rotor about said axis.

3. In combination, a can confining support, means for moving said support to reciprocate a confined row of endwise contacting sealed cans along a common horizontal axis, and resilient means for maintaining the successive cans of the row in contact with each other during said reciprocation.

4. In combination, a can confining support, means for moving said support to reciprocate a confined row of endwise contacting cans along a common axis, and means for maintaining the successive cans in contact with each other during said reciprocation while permitting free longitudinal expansion and contraction of the rows.

5. In combination, a can confining support, means for moving said support to shake a confined row of endwise contacting cylindrical cans along the longitudinal central common axis thereof, and resilient means coacting with an end can of the row to maintain the adjoining cans in contact.

6. In combination, a rotor having peripheral cages for confining rows of endwise contacting cylindrical cans, means for shaking said rotor, and resilient means for maintaining the successive cans of each row in contact with each other during said reciprocation while permitting free longitudinal expansion and contraction of the rows.

7. In combination, a rotor having a central shaft and a plurality of can confining cages disposed around said shaft for holding rows of endwise contacting cans, means for imparting reciprocation of said rotor along the axis of said shaft, a lever extending into each of said cages and cooperable with the end can of the rows confined therein, and resilient means for urging said levers toward the corresponding rows of cans.

8. In combination, a can confining cage comprising an annular series of parallel bars, means for removably supporting one of said bars to permit loading and unloading of said cage, and means for shaking said cage longitudinally of the bars.

9. In combination, a rotor having a series of can confining cages each comprising an annular set of parallel bars, means for removably mounting one of said bars of each set to permit loading and unloading of the corresponding cage, and means for actuating said rotor to agitate the cans confined within said cages.

10. In combination, a rotor having a series of can confining cages each comprising an annular set of parallel bars, means for removably confining one of said bars of each set to permit loading and unloading of the corresponding cage, and means for shaking said rotor longitudinally of said bars and for producing rotation thereof transversely of said bars.

11. In combination, a rotor comprising end discs and a plurality of bars uniting said discs, one of said bars being detachably associated with said discs to effect removal thereof to permit loading and unloading of the rotor, and means for reciprocating said rotor longitudinally of said bars.

12. In combination, a support comprising spaced discs and a plurality of bars cooperating therewith to form a can confining cage, one of said bars being shorter than the others and having a confining plunger cooperable with one of said discs to permit removal of said shorter bar, and means cooperable with said plunger to lock said bar in position.

13. In combination, a can supporting rotor comprising spaced discs and a plurality of bars connecting said discs to form a can confining cage, one of said bars having a plunger at one end thereof cooperating with one of said discs to permit removal of said bar, and a notched rotary locking element carried by said disc for locking said plunger and its carrying bar in position between said discs.

14. In combination, a rotor comprising end walls and bars connecting said walls, one of said bars having a bore and a retaining plunger slidable in said bore, a spring coacting with said plunger to hold said bar in position between said walls, a locking element for retaining said bar and said plunger in position in case said spring becomes ineffective, and means for reciprocating said rotor.

15. In combination, a rotor comprising end walls and a bar connecting said walls, said bar having a plunger at one end thereof for holding the bar in place while permitting removal thereof, resilient means for urging said plunger into bar holding position, a notched disk cooperable with said bar and plunger to lock these elements against release from bar holding position in case said resilient means becomes ineffective, and means for reciprocating said rotor.

16. In combination, a casing, a rotor mounted upon a central shaft within said casing, means for supporting liquid laden containers near the periphery of said rotor, means associated with said shaft for reciprocating said rotor along the axis of said shaft and within said casing, means associated with the opposite end of said shaft for revolving said rotor about said axis and within said casing, and a removable door near the upper portion of said casing for permitting loading and unloading of the rotor.

17. In combination, a casing, a rotor mounted within said casing, said rotor having a series of peripheral cages, means associated with one end of said rotor for reciprocating the same along an axis within said casing, means associated with the opposite end of said rotor for revolving the same about said axis, and a door near the upper portion of said casing for permitting loading and unloading of said cages.

18. In combination, a container support, means for moving said support to reciprocate a sealed liquid-laden cylindrical container confined therein along the axis of the container, and means for bodily displacing the container about another parallel axis.

19. In combination, a container support, means for moving said support to reciprocate an annular series of sealed liquid-laden cylindrical containers along the axis of annularity of the series, and means for displacing the series about said axis.

20. In combination, a container support, means for moving said support to reciprocate an annular series of sealed liquid-laden cylindrical containers along the axis of annularity of the series, and means for displacing the series about said axis during reciprocation thereof.

FRANK D. CHAPMAN.